US012370569B2

(12) United States Patent
Bleyer et al.

(10) Patent No.: US 12,370,569 B2
(45) Date of Patent: Jul. 29, 2025

(54) VISCOUS MATERIAL DEPOSITION NOZZLE AND METHODS OF USE

(71) Applicant: The Boeing Company, Chicago, IL (US)

(72) Inventors: Christopher J. Bleyer, North Charleston, SC (US); Shaun A. Condie, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 170 days.

(21) Appl. No.: 18/060,781

(22) Filed: Dec. 1, 2022

(65) Prior Publication Data

US 2024/0181486 A1 Jun. 6, 2024

(51) Int. Cl.
*B05C 5/02* (2006.01)
*B05D 1/26* (2006.01)

(52) U.S. Cl.
CPC ............ *B05C 5/0254* (2013.01); *B05D 1/265* (2013.01)

(58) Field of Classification Search
None
See application file for complete search history.

(56) References Cited

U.S. PATENT DOCUMENTS 4,771,820 A * 9/1988 Williams ............. B22D 11/064 164/463
4,990,293 A * 2/1991 Macosko ................ B29C 48/08 425/149
2004/0091617 A1* 5/2004 Peter ....................... B05D 1/002 118/300
2004/0149204 A1* 8/2004 Park .................... B05C 17/0325 118/200
2020/0147638 A1* 5/2020 Buck, Jr. ................. B05C 5/025
2021/0079267 A1* 3/2021 Snyder .................. B05C 5/0254

OTHER PUBLICATIONS

"Semco® specialty application nozzles," technical data, Semco® Application Systems, PRC-DeSoto International, Inc., A PPG Industries Company, issued Nov. 2002, 2 pages. https://www.ppgaerospace.com/getmedia/4ac67a55-7be2-408a-b815-6a03791a83a8/rbbnnozz.pdf?ext =.pdf.

* cited by examiner

*Primary Examiner* — Charles Capozzi
(74) *Attorney, Agent, or Firm* — Yee & Associates, P.C.

(57) ABSTRACT

A viscous material deposition nozzle and methods of use are provided. The viscous material deposition nozzle comprises a pair of lifts, an application surface, and a plurality of outlets. The pair of lifts is positioned on a first side and a second side of the viscous material deposition nozzle and comprises contact surfaces. The application surface is positioned between the pair of lifts and comprises a leading face a first distance from the contact surfaces and a trailing face a second distance from the contact surfaces. The second distance is less than the first distance. The plurality of outlets extend through the application surface.

23 Claims, 12 Drawing Sheets

VISCOUS MATERIAL DEPOSITION NOZZLE AND METHODS OF USE

BACKGROUND INFORMATION

1. Field

The present disclosure relates generally to applying viscous materials to substrates and more specifically to applying a wide material film.

2. Background

During manufacturing of large structures, sealants, adhesives, and other viscous materials are applied to substrates. To apply a viscous material to a substrate, a nozzle is selected and connected to a viscous material cartridge. Nozzles are typically disposable.

Current nozzles include ribbon nozzles with a single elongated outlet. Current ribbon nozzles are limited in application width.

Therefore, it would be desirable to have a method and apparatus that takes into account at least some of the issues discussed above, as well as other possible issues.

SUMMARY

An embodiment of the present disclosure provides a viscous material deposition nozzle comprises a pair of lifts, an application surface, and a plurality of outlets. The pair of lifts is positioned on a first side and a second side of the viscous material deposition nozzle and comprises contact surfaces. The application surface is positioned between the pair of lifts and comprises a leading face a first distance from the contact surfaces and a trailing face a second distance from the contact surfaces. The second distance is less than the first distance. The plurality of outlets extend through the application surface.

Another embodiment of the present disclosure provides a viscous material deposition nozzle. The viscous material deposition nozzle comprises a V-shaped distribution cavity configured to distribute a viscous material from an inlet to a plurality of outlets extending through a stepped application surface, and the stepped application surface configured to evenly spread the viscous material and then scrape the viscous material to a finished thickness.

Yet another embodiment of the present disclosure provides a method of applying a viscous material to a surface of a substrate. The viscous material is extruded through a plurality of outlets extending through an application surface of a viscous material deposition nozzle. The viscous material is scraped to a finished thickness using a trailing face of the application surface of the viscous material deposition nozzle as the viscous material deposition nozzle moves across the surface on a pair of lifts elevating the trailing face a distance above the surface of the substrate.

A yet further embodiment of the present disclosure provides a method of applying a viscous material to a surface of a substrate. The viscous material is extruded through a plurality of outlets of a viscous material deposition nozzle. The viscous material is leveled to an even layer having a finished thickness using the viscous material deposition nozzle as the viscous material deposition nozzle moves across the surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative examples recognize and take into account one or more different considerations. The illustrative examples recognize and take into account that single-use nozzles for material extrusion that are publicly available do not allow extrusion of material films wider than approximately 1.75 inches. The illustrative examples recognize and take into account that single-use nozzles for material extrusion that are publicly available do not provide for thickness control of extruded material films. The illustrative examples recognize and take into account that after depositing a material film using a ribbon nozzle, an operator uses a scraper to smooth and thin the material film. The illustrative examples recognize and take into account that scraping the material film uses an additional tool, takes more time, and causes more material waste.

The illustrative examples present viscous material deposition nozzles and methods of use. The illustrative examples deposit a viscous material film with a width greater than 1.75 inches. In some illustrative examples, the viscous material film is deposited with a width of 3 inches or greater. The illustrative examples deposit a viscous material film with a controlled thickness.

Figure 1:
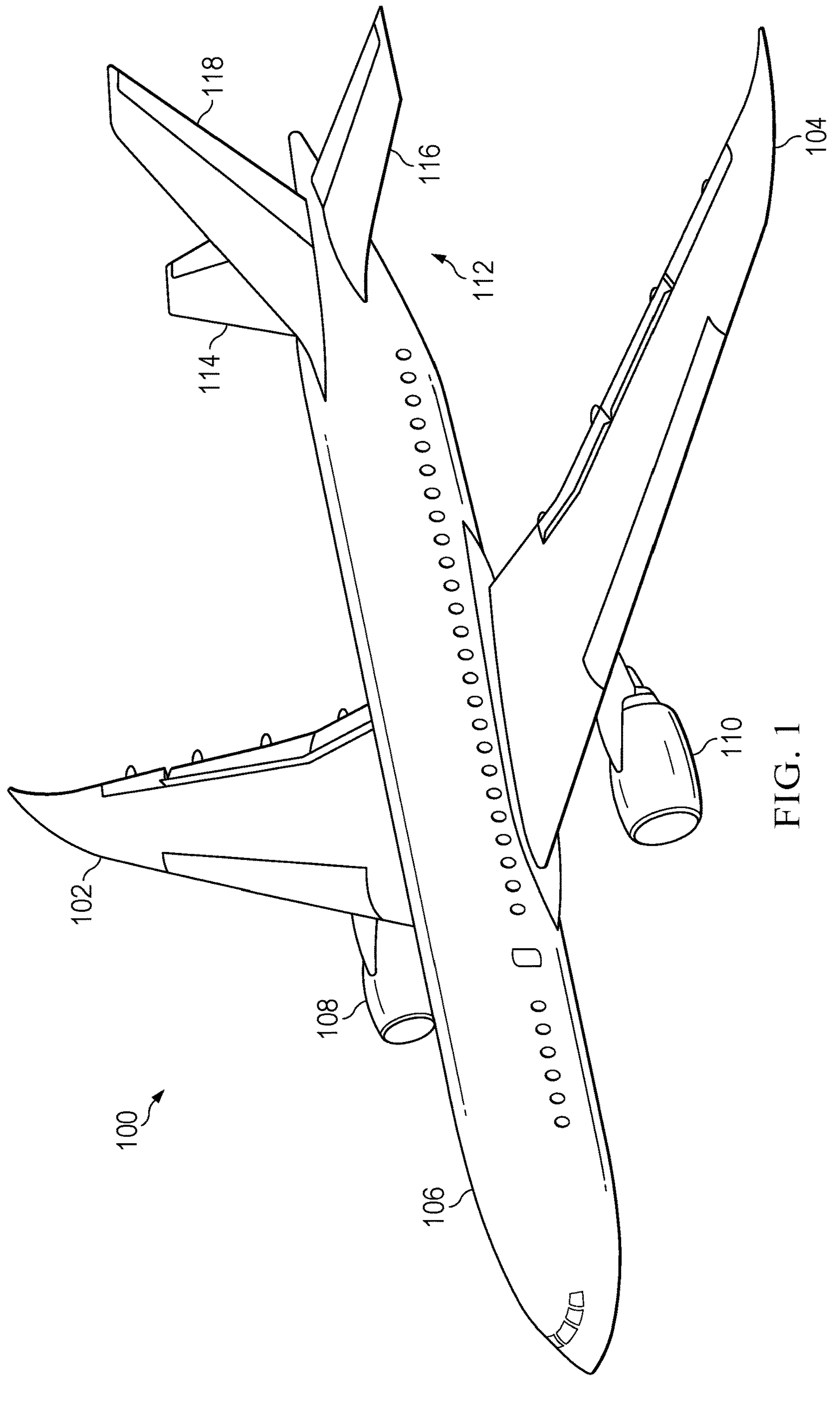
FIG. 1 is an illustration of an aircraft in accordance with an illustrative embodiment.

Turning now to FIG. 1, an illustration of an aircraft is depicted in accordance with an illustrative embodiment. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft having components with sealants, adhesives, or other viscous materials applied using the viscous material deposition nozzle of the illustrative examples. Aircraft 100 is an example of an aircraft having components with sealants, adhesives, or other viscous materials applied using the methods of the illustrative examples.

Figure 2:
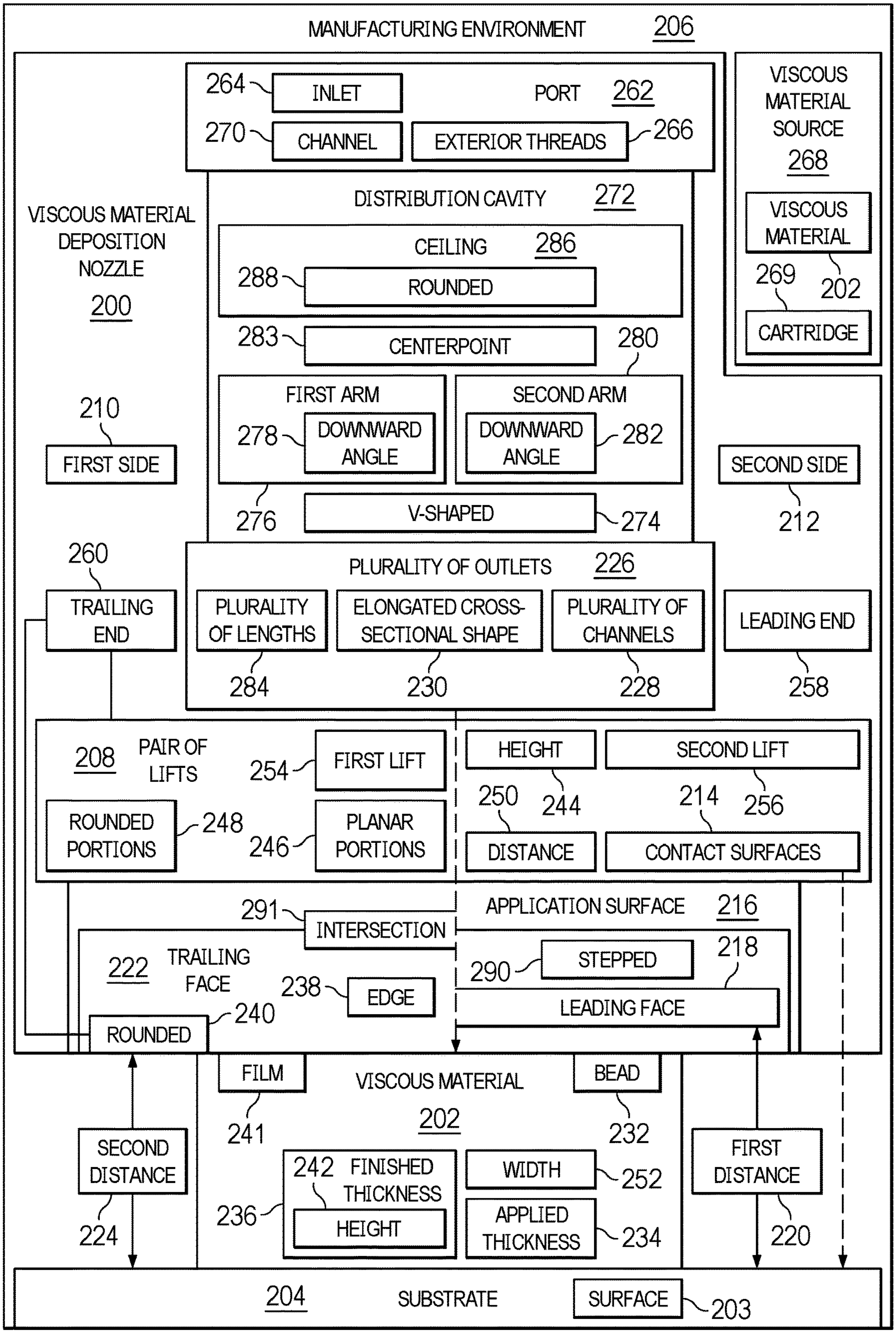
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Viscous material deposition nozzle 200 can be used to deposit viscous material 202 on substrate 204 in manufacturing environment 206. Viscous material deposition nozzle 200 comprises pair of lifts 208 positioned on first side 210 and second side 212 of viscous material deposition nozzle 200. Pair of lifts 208 comprises contact surfaces 214.

Viscous material deposition nozzle 200 comprises application surface 216 positioned between pair of lifts 208 and comprising leading face 218 first distance 220 from contact surfaces 214 and trailing face 222 second distance 224 from contact surfaces 214. Second distance 224 is less than first distance 220.

Viscous material deposition nozzle 200 further comprises plurality of outlets 226 extending through application surface 216. In some illustrative examples, plurality of outlets 226 can be referred to as plurality of channels 228.

Plurality of outlets 226 comprises any desirable quantity of outlets. Plurality of outlets 226 comprises any desirable shape of outlets. In some illustrative examples, plurality of outlets 226 has elongated cross-sectional shape 230.

Plurality of outlets 226 is positioned at any desirable location through application surface 216. In some illustrative examples, plurality of outlets 226 is positioned at an intersection 291 of leading face 218 and trailing face 222.

Viscous material 202 is extruded through plurality of outlets 226 to between application surface 216 and surface 203 of substrate 204. Viscous material 202 exits plurality of outlets 226 and forms bead 232 of viscous material 202. Bead 232 of viscous material 202 has applied thickness 234 greater than a desired thickness for a resulting material film. Applied thickness 234 of bead 232 of viscous material 202 is based on first distance 220 of leading face 218 from substrate 204. Bead 232 of viscous material 202 is scraped to form finished thickness 236. In some illustrative examples, bead 232 of viscous material 202 is scraped by edge 238 of trailing face 222. In some illustrative examples, bead 232 of viscous material 202 is scraped by rounded 240 portion of trailing face 222.

After scraping, viscous material 202 has finished thickness 236. Viscous material 202 with finished thickness 236 can be referred to as viscous material 202 film 241.

When viscous material 202 has finished thickness 236, viscous material 202 has height 242 from substrate 204. Height 242 is formed by second distance 224 of trailing face 222 from surface 203 of substrate 204.

Second distance 224 of trailing face 222 from contact surfaces 214 is influenced by height 244 of pair of lifts 208. As viscous material deposition nozzle 200 moves relative to substrate 204, contact surfaces 214 of pair of lifts 208 are in contact with substrate 204. In some illustrative examples, planar portions 246 of contact surfaces 214 are in contact with substrate as viscous material deposition nozzle 200 moves relative to substrate 204. In some illustrative examples, rounded portions 248 of contact surfaces 214 are in contact with substrate as viscous material deposition nozzle 200 moves relative to substrate 204.

Distance 250 between pair of lifts 208 controls width 252 of viscous material 202 deposited. Width 252 can be adjusted by changing distance 250 between pair of lifts 208. In some illustrative examples, width 252 is equal to or greater than 3 inches. Pair of lifts 208 include first lift 254 on first side 210 of viscous material deposition nozzle 200 and second lift 256 on second side 212 of viscous material deposition nozzle 200.

Viscous material deposition nozzle 200 comprises leading end 258 and trailing end 260. Viscous material deposition nozzle 200 leads with leading end 258. Finished thickness 236 is formed by trailing face 222.

Trailing face 222 comprises rounded 240 portion on trailing end 260 of viscous material deposition nozzle 200. Pair of lifts 208 comprises rounded portions 248 on trailing end 260 of viscous material deposition nozzle 200.

Viscous material 202 is introduced to viscous material deposition nozzle 200 at port 262. In some illustrative examples, port 262 can also be referred to as inlet 264. Port 262 has exterior threads 266 configured to connect to viscous material source 268. In some illustrative examples, viscous material source 268 takes the form of cartridge 269. In these illustrative examples, exterior threads 266 are configured to interface with cartridge 269.

Viscous material 202 travels through channel 270 of port 262 to distribution cavity 272. Distribution cavity 272 within viscous material deposition nozzle 200 is configured to distribute viscous material 202 to plurality of outlets 226.

Distribution cavity 272 is V-shaped 274 with a first arm 276 extending at downward angle 278 towards first side 210 of viscous material deposition nozzle 200 and second arm 280 extending at downward angle 282 toward second side 212 of viscous material deposition nozzle 200. Distribution cavity 272 has centerpoint 283 at channel 270.

Plurality of outlets 226 has plurality of lengths 284 from distribution cavity 272 to application surface 216. Plurality of lengths 284 is due to V-shaped 274 distribution cavity 272.

In some illustrative examples, ceiling 286 of the distribution cavity is rounded 288. Rounded 288 ceiling 286 of distribution cavity 272 allows for additive manufacturing of viscous material deposition nozzle 200.

Height 244 of pair of lifts 208 controls a thickness of viscous material 202 deposited.

In viscous material deposition nozzle 200, V-shaped 274 distribution cavity 272 configured to distribute viscous material 202 from inlet 264 to plurality of outlets 226 extending through stepped 290 application surface 216. Stepped 290 application surface 216 is configured to evenly spread viscous material 202 and then scrape viscous material 202 to finished thickness 236. Stepped 290 application surface 216 comprises leading face 218 and trailing face 222, trailing face 222 extending outwardly away from leading face 218.

In some illustrative examples, plurality of outlets 226 extend along intersection 291 between leading face 218 and trailing face 222. Stepped 290 application surface 216 extends between pair of lifts 208 configured to set width 252 of viscous material 202 applied.

Pair of lifts 208 is configured, along with trailing face 222 of stepped 290 application surface 216, to control finished thickness 236.

The illustration of manufacturing environment 206 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although not depicted, in some illustrative examples, leading end 258 can have guards associated with first side 210 and second side 212. In these illustrative examples, the guards catch excess viscous material 202 and stop excess viscous material 202 from flowing over either first side 210 or second side 212.

Figure 3:
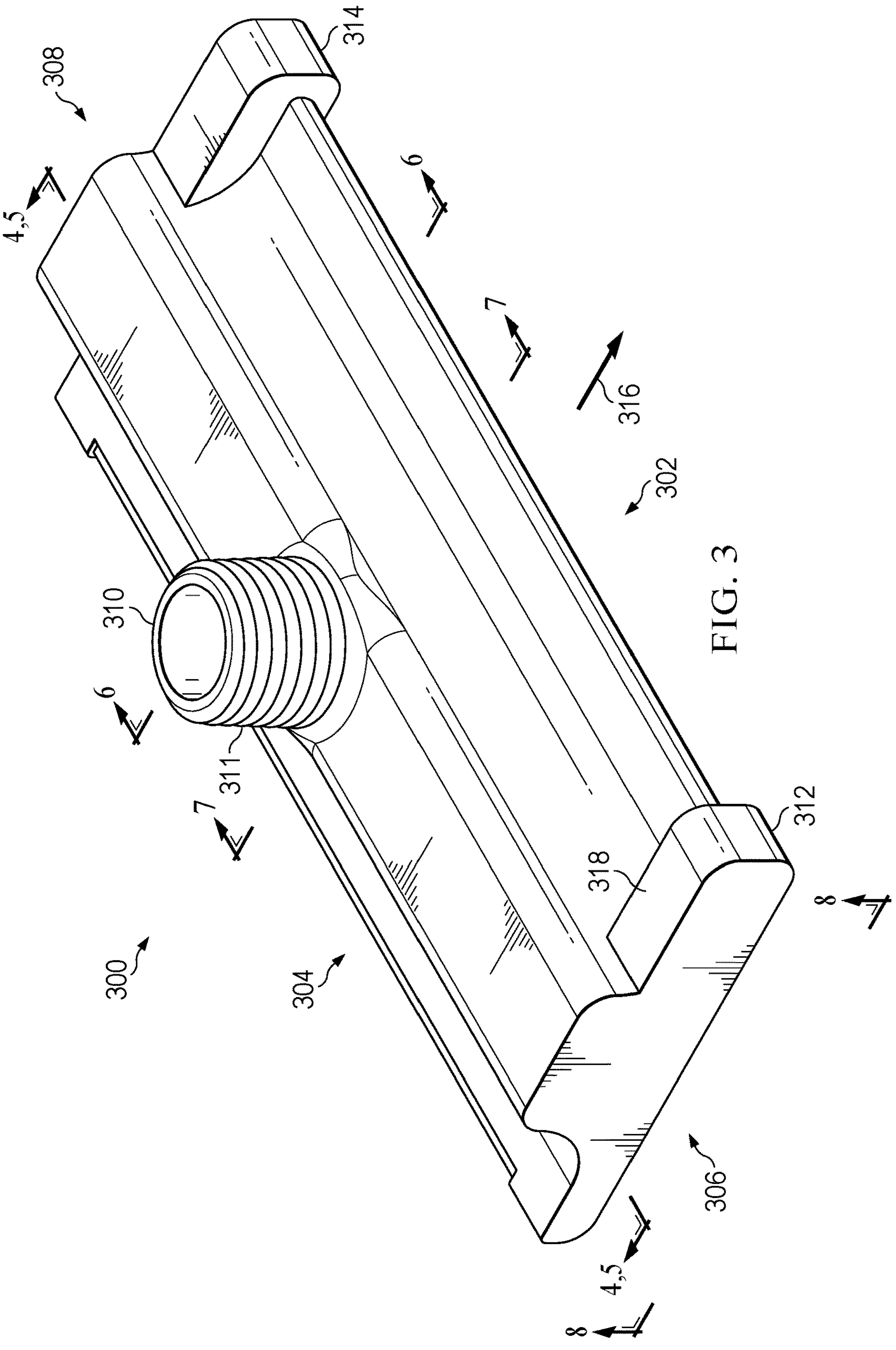
FIG. 3 is an illustration of an isometric view of a viscous material deposition nozzle in accordance with an illustrative embodiment.

Turning now to FIG. 3, an illustration of an isometric view of a viscous material deposition nozzle is depicted in accordance with an illustrative embodiment. Viscous material deposition nozzle 300 is a physical implementation of viscous material deposition nozzle 200 of FIG. 2. Viscous material deposition nozzle 300 can be used to deposit a viscous material in manufacturing components of aircraft 100 of FIG. 1.

Viscous material deposition nozzle 300 comprises leading end 302 and trailing end 304. Viscous material deposition nozzle 300 further comprises first side 306 and second side 308. Port 310 of viscous material deposition nozzle 300 is configured to receive a viscous material from a viscous material source. As depicted, port 310 has exterior threads 311 to interface with a viscous material source.

Viscous material deposition nozzle 300 has a pair of lifts, first lift 312 and second lift 314. Viscous material deposition nozzle 300 is moved in direction 316 as viscous material is extruded from viscous material deposition nozzle 300. First lift 312 and second lift 314 are in contact with a substrate (not depicted) to receive the viscous material as viscous material deposition nozzle 300 moves in direction 316.

Guards 318 are present on first side 306 and second side 308 to catch excess viscous material. Guards 318 catch excess viscous material that travels up and over leading end 302.

Figure 4:
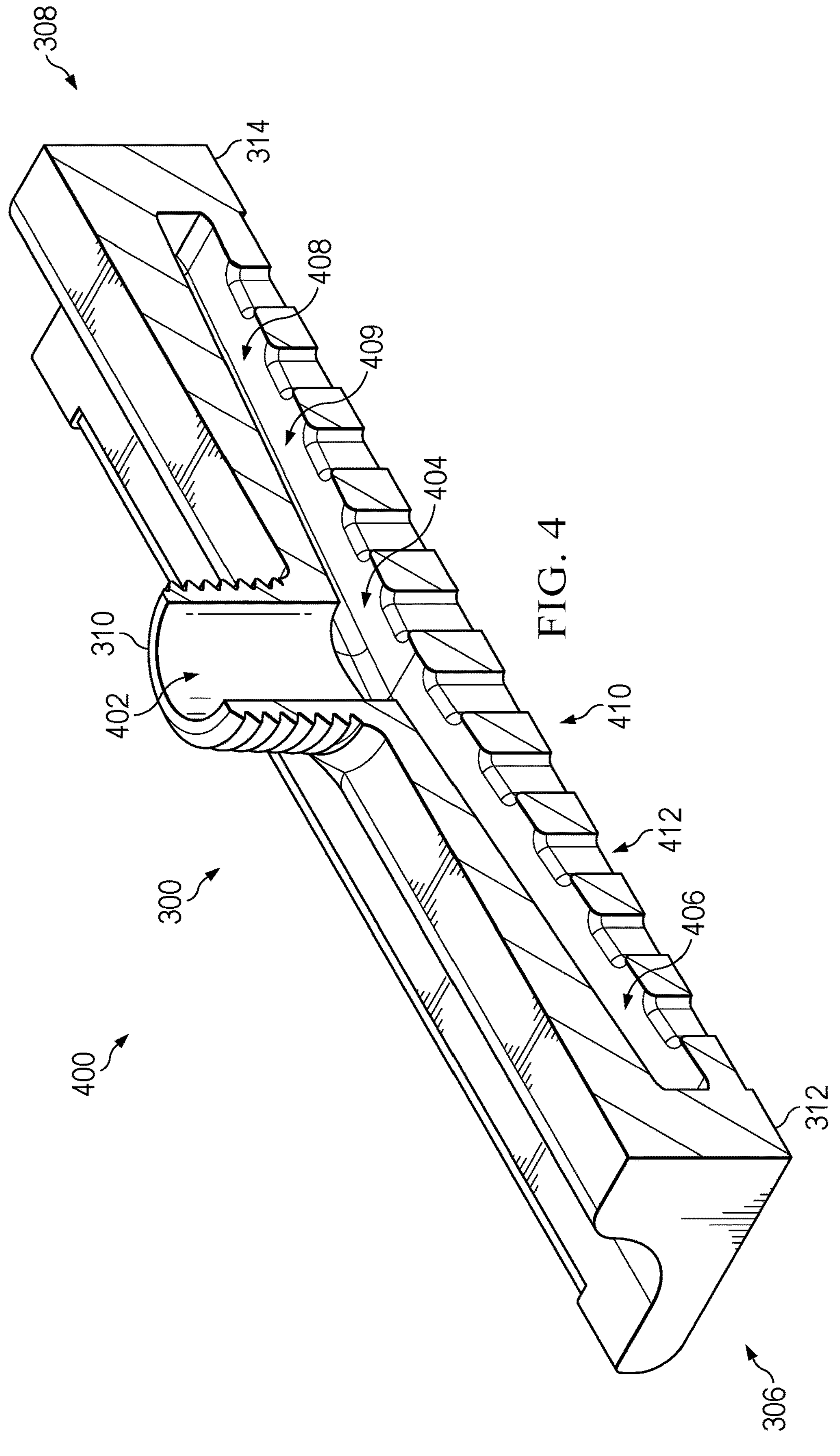
FIG. 4 is an illustration of an isometric cross-sectional view of a viscous material deposition nozzle in accordance with an illustrative embodiment.

Turning now to FIG. 4, an illustration of an isometric cross-sectional view of a viscous material deposition nozzle is depicted in accordance with an illustrative embodiment. View 400 is a cross-sectional view of viscous material deposition nozzle 300 along line 4-4 in FIG. 3.

View 400 is a cross-sectional view from first side 306 to second side 308. View 400 is a cut through port 310. Channel 402 through port 310 is visible in view 400. Channel 402 is connected to distribution cavity 404. Distribution cavity 404 extends from channel 402 towards first side 306 and second side 308. First arm 406 of distribution cavity 404 extends from channel 402 towards first side 306. Second arm 408 of distribution cavity 404 extends from channel 402 towards second side 308. In this illustrative example, distribution cavity 404 is V-shaped 409. First arm 406 and second arm 408 extend downward from channel 402 towards application surface 410.

As depicted, distribution cavity 404 is V-shaped 409 with first arm 406 extending at a downward angle towards first side 306 of viscous material deposition nozzle 300 and second arm 408 extending at a downward angle toward second side 308 of viscous material deposition nozzle 300. Distribution cavity 404 within viscous material deposition nozzle 300 is configured to distribute viscous material to plurality of outlets 412. Plurality of outlets 412 extends through application surface 410.

Figure 5:
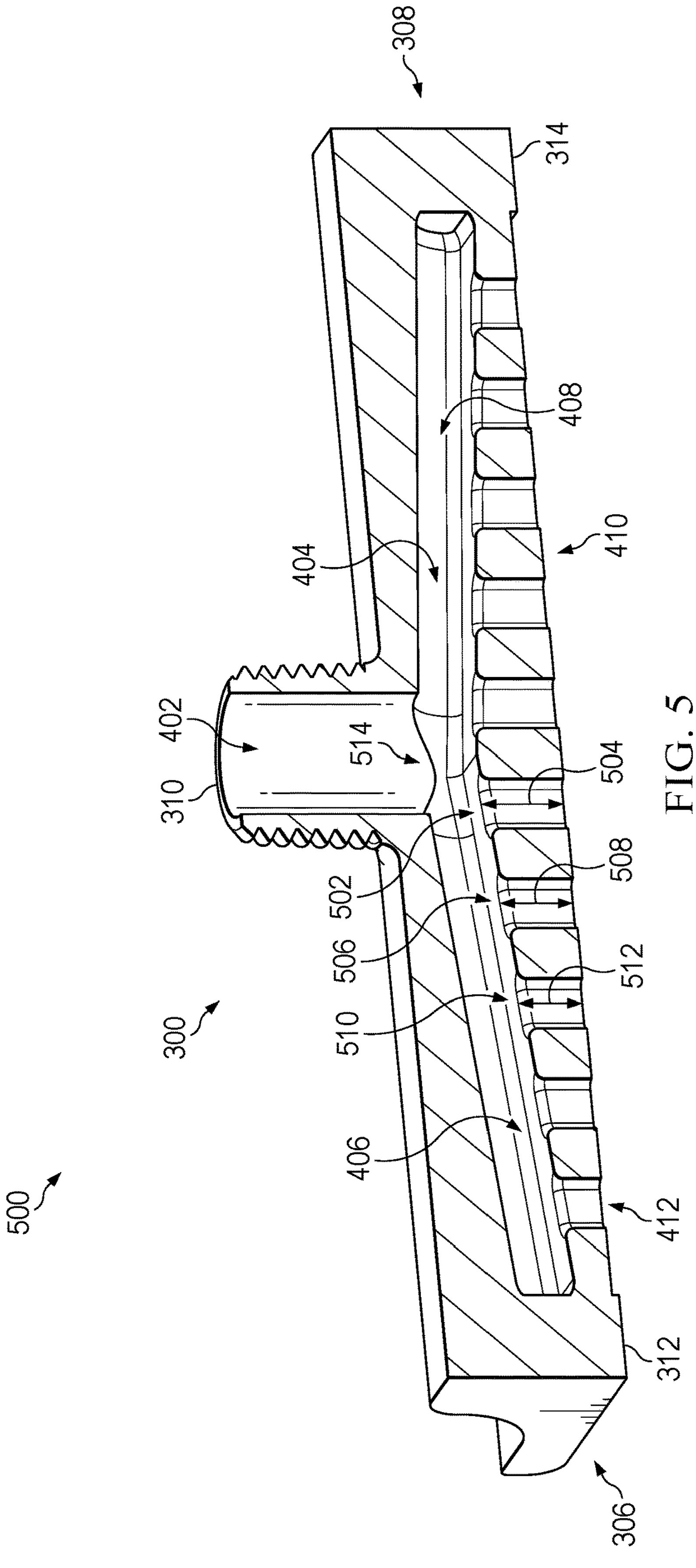
FIG. 5 is an illustration of a longitudinal cross-sectional view of a viscous material deposition nozzle in accordance with an illustrative embodiment.

Turning now to FIG. 5, an illustration of a longitudinal cross-sectional view of a viscous material deposition nozzle is depicted in accordance with an illustrative embodiment. View 500 is a cross-sectional view of viscous material deposition nozzle 300 along line 5-5 in FIG. 3.

Plurality of outlets 412 are visible in view 500. Due to the downward angle of first arm 406 and second arm 408, plurality of outlets 412 has a plurality of lengths from distribution cavity 404 to application surface 410. For example, outlet 502 of plurality of outlets 412 has length 504. Length 504 is greater than length 508 of outlet 506. Length 508 is greater than length 512 of outlet 510.

Due to the downward angle of first arm 406 and the downward angle of second arm 408, plurality of outlets 412 shrink in length, from centerpoint 514 of distribution cavity 404 to respective outer ends, first side 306 or second side 308. The downward angles and plurality of lengths of plurality of outlets 412 improve extrusion of viscous materials at the outer ends, first side 306 and second side 308, of viscous material deposition nozzle 300, allowing even extrusion overall.

Figure 6:
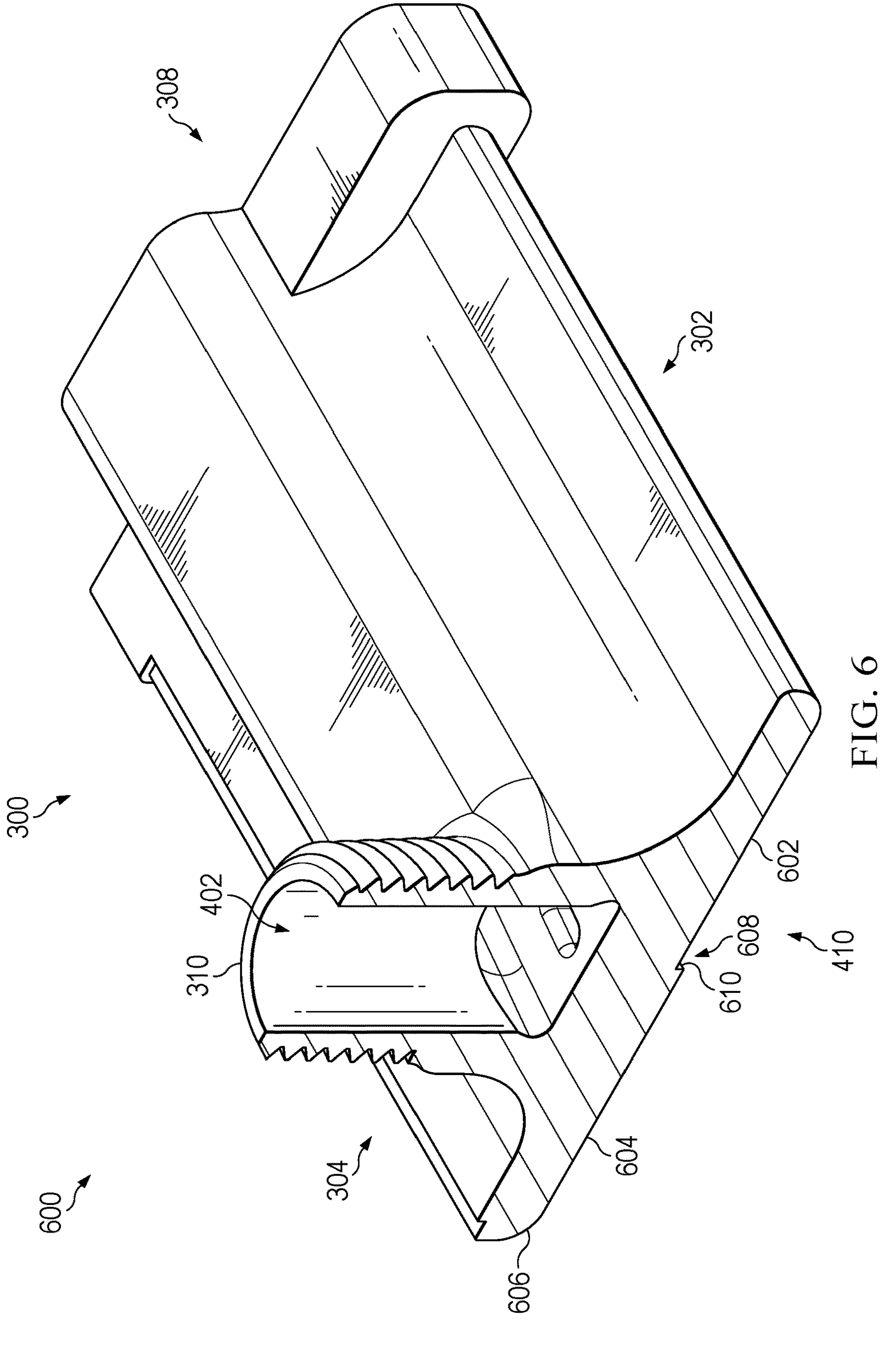
FIG. 6 is an illustration of a cross-sectional view of a viscous material deposition nozzle in accordance with an illustrative embodiment.

Turning now to FIG. 6, an illustration of a cross-sectional view of a viscous material deposition nozzle is depicted in accordance with an illustrative embodiment. View 600 is a cross-sectional view of viscous material deposition nozzle 300 along line 6-6 in FIG. 3.

View 600 is a cut from leading end 302 to trailing end 304 of viscous material deposition nozzle 300. A portion of application surface 410 is visible in view 600. Application surface 410 comprises leading face 602 and trailing face 604. Trailing face 604 extends farther outward from distribution cavity 404 than leading face 602.

Trailing face 604 includes rounded portion 606 on trailing end 304. Rounded portion 606 of trailing face 604 can be used to form the viscous material to a finished thickness.

As depicted, plurality of outlets 412 extend through intersection 608 between leading face 602 and trailing face 604. In this illustrative example, edge 610 of trailing face 604 can be used to cut viscous material exiting plurality of outlets 412.

Figure 7:
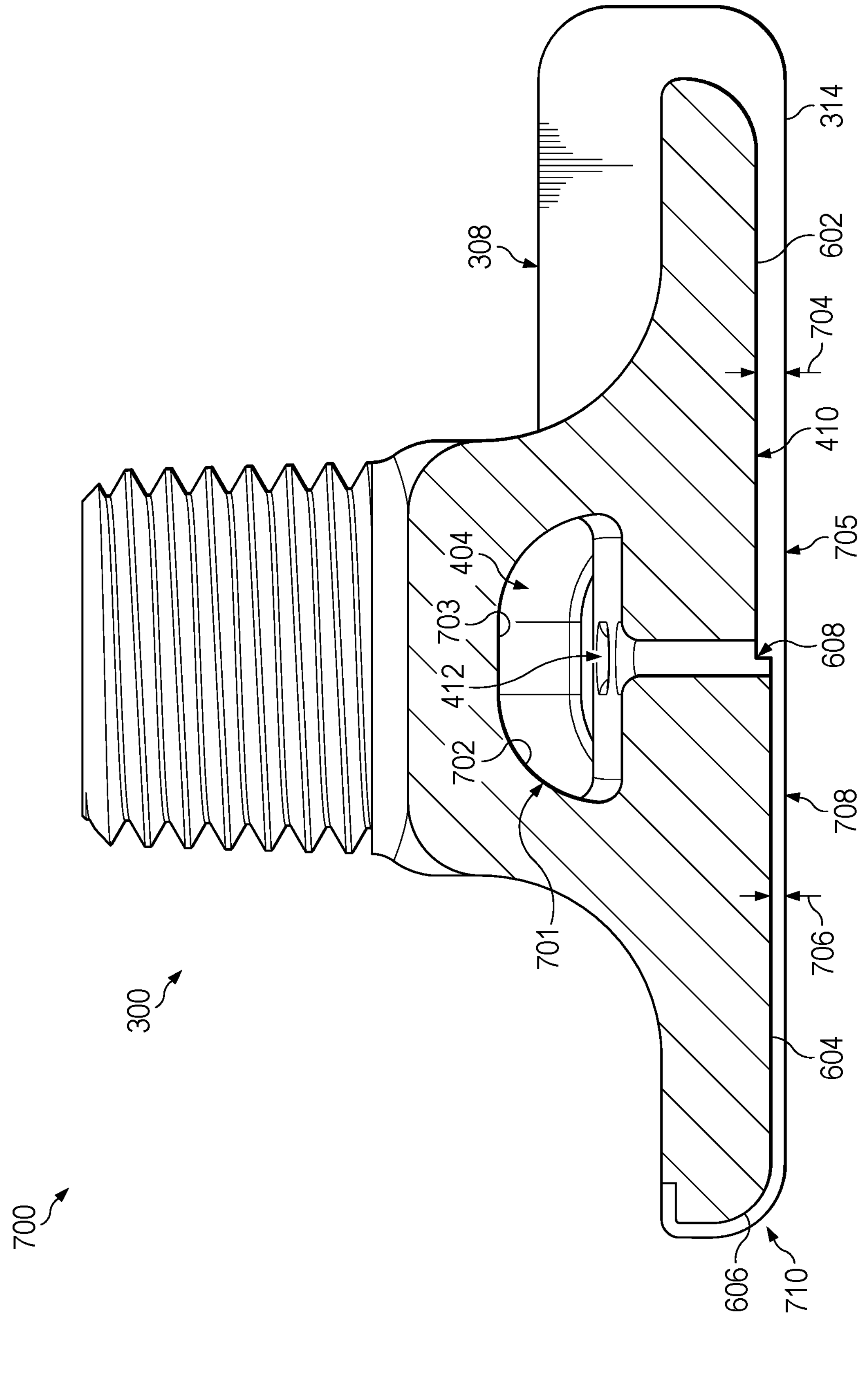
FIG. 7 is an illustration of a cross-sectional view of a viscous material deposition nozzle in accordance with an illustrative embodiment.

Turning now to FIG. 7, an illustration of a cross-sectional view of a viscous material deposition nozzle is depicted in accordance with an illustrative embodiment. View 700 is a cross-sectional view of viscous material deposition nozzle 300 along line 7-7 in FIG. 3.

View 700 is a view looking towards second side 308. In view 700, cross-sectional shape 701 of distribution cavity 404 is visible. Distribution cavity 404 has curvature 702 forming ceiling 703.

A high radius at ceiling 703 of distribution cavity 404 allows supportless additive manufacturing with a fused deposition modeling process. Curvature 702 allows distribution cavity 404 to be self-supporting for FDM-additive manufacturing (filament 3D-printing). During additive manufacturing, a melted thermoplastic bead is deposited layer-by-layer, then cooled and solidified.

Curvature 702 is configured such that the bead on each layer makes contact with the bead on the layer below, and is thus supported by the layer below. If the bead on a certain layer does not make contact with the bead on the layer below, it will collapse unless supported.

Leading face 602 of application surface 410 is first distance 704 from contact surfaces 705 of the pair of lifts, including second lift 314. Trailing face 604 is second distance 706 from contact surfaces 705. Second distance 706 sets the finished thickness of the viscous material. Second distance 706 can be changed by changing a position of trailing face 604 or a position of the pair of lifts, including second lift 314.

Contact surfaces 705 comprise planar portions 708 and rounded portions 710. Viscous material deposition nozzle 300 can move across a substrate with at least one of planar portions 708 or rounded portions 710 in contact with the substrate (not depicted).

View 700 cuts through outlet 506. As can be seen in FIG. 7, plurality of outlets 412 extend through application surface 410 at intersection 608 of leading face 602 and trailing face 604.

Figure 8:
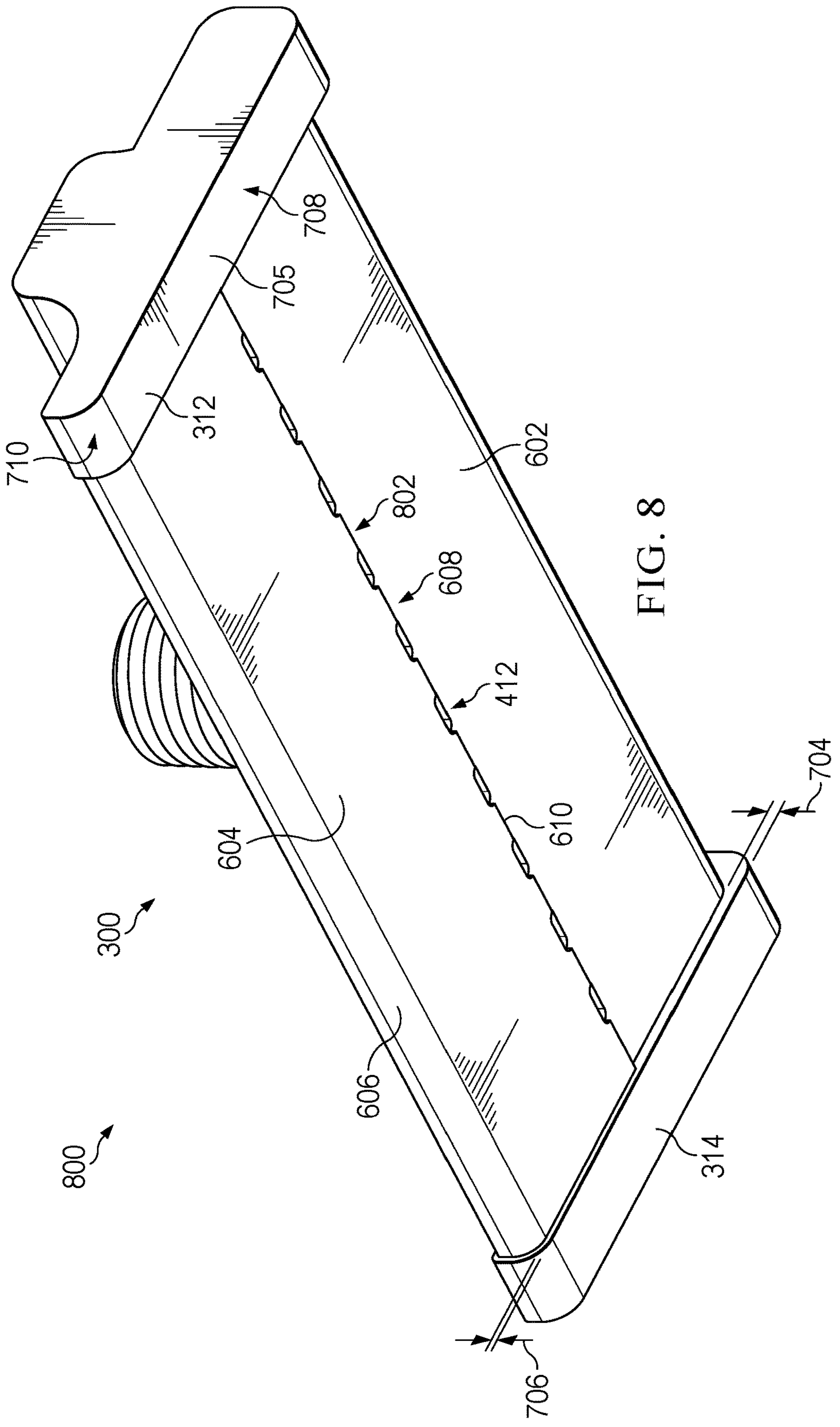
FIG. 8 is an illustration of an isometric bottom view of a viscous material deposition nozzle in accordance with an illustrative embodiment.

Turning now to FIG. 8, an illustration of an isometric bottom view of a viscous material deposition nozzle is depicted in accordance with an illustrative embodiment. View 800 is a view of viscous material deposition nozzle 300 from direction 8 in FIG. 3.

Trailing face 604 can also be referred to as a ‘shaving’ face. Edge 802 of trailing face 604 ‘slices’ the extruded material (not depicted) to a thickness corresponding to second distance 706. In some illustrative examples, the viscous material is laid down at a thickness slightly greater than the desired thickness, and then “shaved” to the desired thickness. Laying down at a greater thickness eases the extrusion of higher viscosity materials. “Shaving” helps eliminate surface inconsistencies (e.g. bubbles) and improves uniformity in material thickness.

Figure 9:
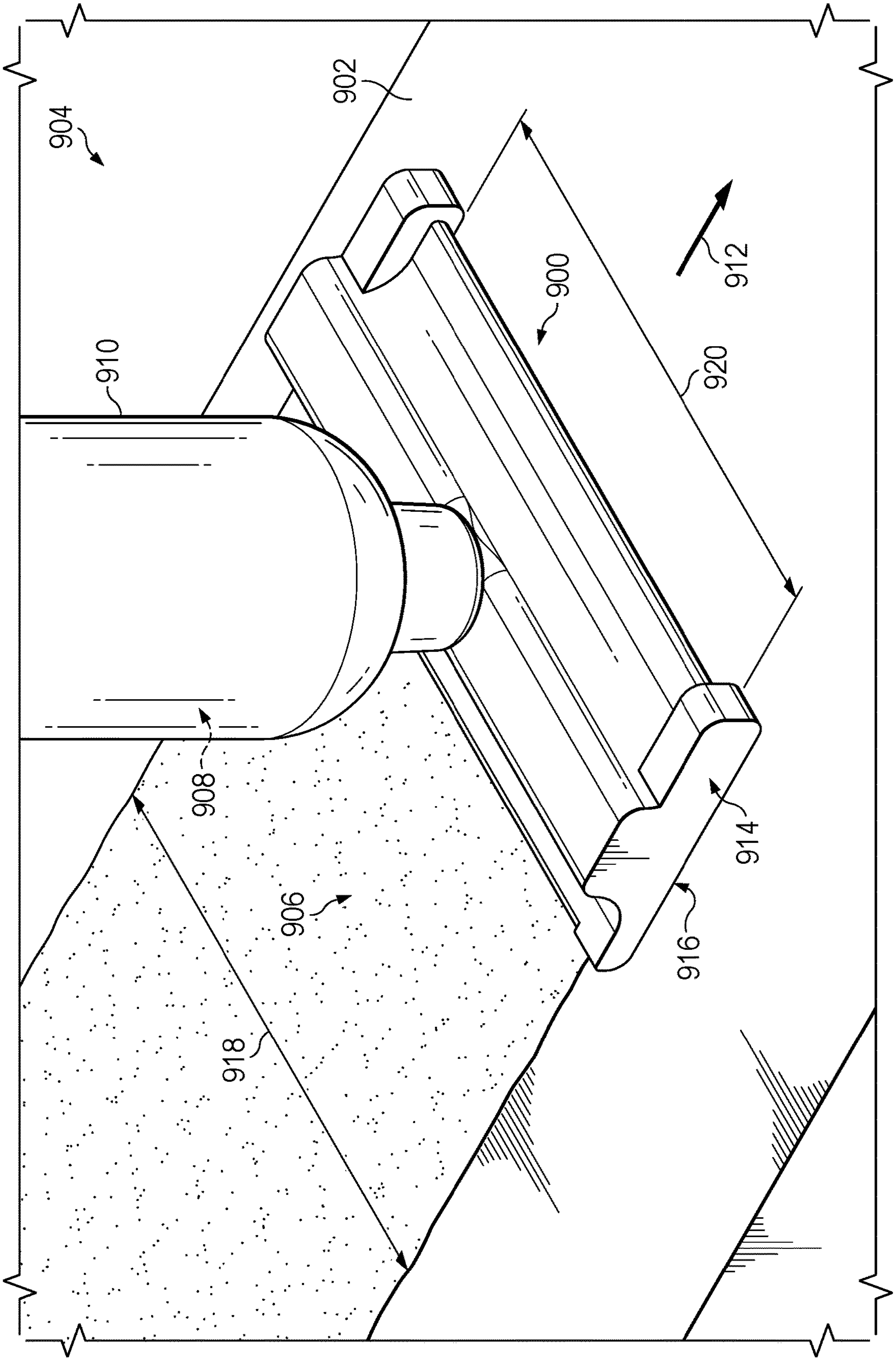
FIG. 9 is an illustration of a viscous material deposition nozzle in operation in accordance with an illustrative embodiment.

Turning now to FIG. 9, an illustration of a viscous material deposition nozzle in operation is depicted in accordance with an illustrative embodiment. Viscous material deposition nozzle 900 is a physical implementation of viscous material deposition nozzle 200 of FIG. 2. In some illustrative examples, viscous material deposition nozzle 900 is the same as viscous material deposition nozzle 300 of FIGS. 3-8. Viscous material deposition nozzle 900 can be used to deposit viscous materials in manufacturing components of aircraft 100 of FIG. 1.

Substrate 902 is present in manufacturing environment 904. Viscous material deposition nozzle 900 deposits viscous material 906 onto substrate 902. Viscous material source 908 is connected to viscous material deposition nozzle 900 on a port (not depicted) of viscous material deposition nozzle 900. In this illustrative example, viscous material source 908 takes the form of cartridge 910.

As viscous material deposition nozzle 900 moves in direction 912 across substrate 902, viscous material 906 is extruded through viscous material deposition nozzle 900. In this illustrative example, viscous material deposition nozzle 900 moves across substrate 902 on pair of lifts 914. In this illustrative example, planar portions 916 of pair of lifts 914 are in contact with substrate 902 as viscous material deposition nozzle 900 moves across substrate 902.

Viscous material 906 has width 918 controlled by width 920 between pair of lifts 914. The thickness of viscous material 906 is controlled by pair of lifts 914 and a distance of a trailing face (not depicted) of viscous material deposition nozzle 900 from substrate 902.

Viscous material 906 has been leveled to an even layer having a finished thickness using viscous material deposition nozzle 900 as viscous material deposition nozzle 900 moves across the surface of substrate 902. A trailing face (not depicted) of an application surface (not depicted) of viscous material deposition nozzle 900 is pulled against viscous material 906 to level viscous material 906 as viscous material deposition nozzle 900 moves across substrate 902.

Figure 10:
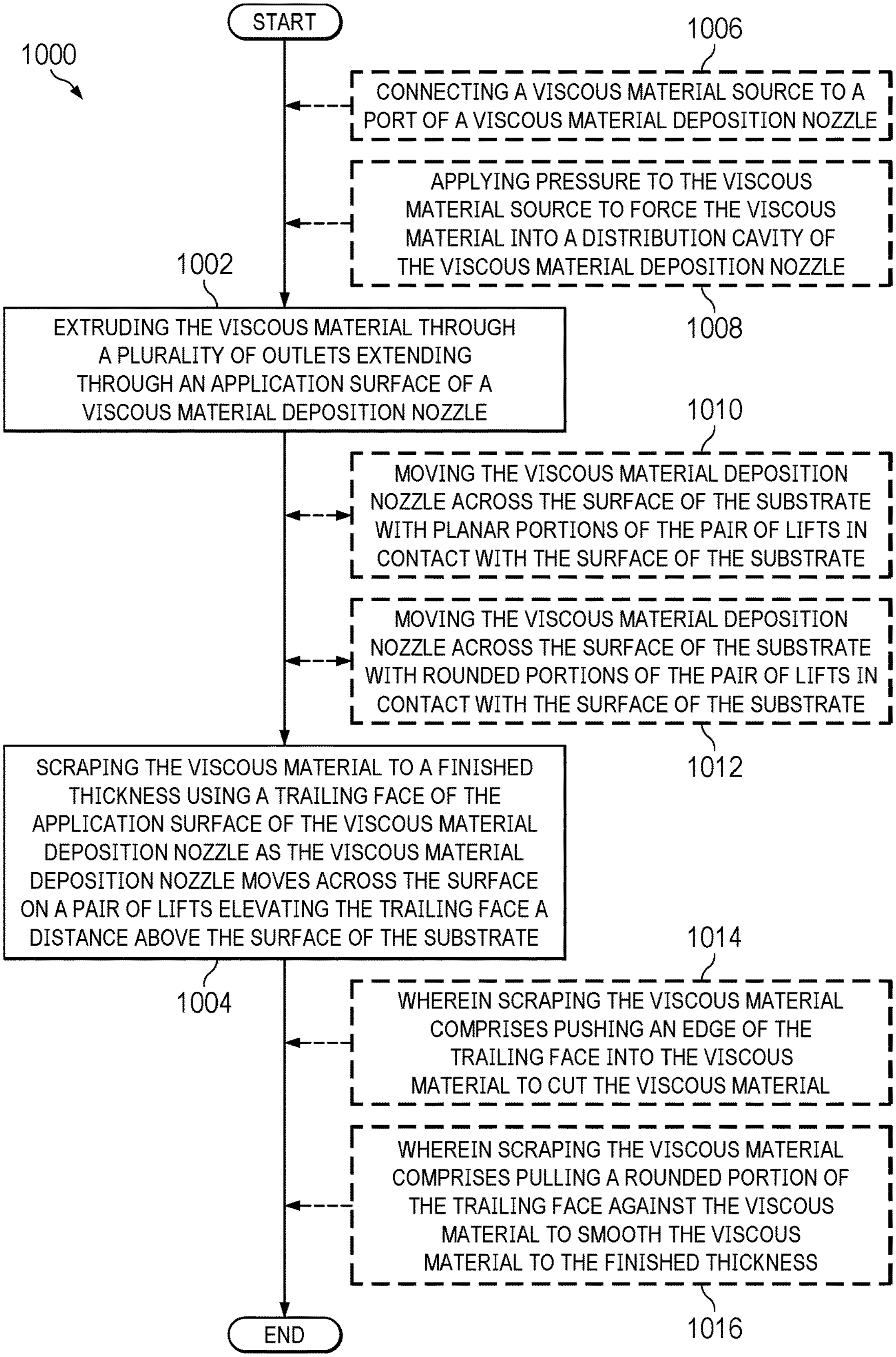
FIG. 10 is a flowchart of method of applying a viscous material to a surface of a substrate in accordance with an illustrative embodiment.

Turning now to FIG. 10, a flowchart of method of applying a viscous material to a surface of a substrate is depicted in accordance with an illustrative embodiment. Method 1000 can be performed to form a component of aircraft 100 of FIG. 1. Method 1000 can be performed using viscous material deposition nozzle 200 of FIG. 2. Method 1000 can be performed using viscous material deposition nozzle 300 of FIGS. 3-8. Method 1000 can be performed using viscous material deposition nozzle 900 of FIG. 9.

Method 1000 extrudes the viscous material through a plurality of outlets extending through an application surface of a viscous material deposition nozzle (operation 1002). Method 1000 scrapes the viscous material to a finished thickness using a trailing face of the application surface of the viscous material deposition nozzle as the viscous material deposition nozzle moves across the surface on a pair of lifts elevating the trailing face a distance above the surface of the substrate (operation 1004). Afterwards, method 1000 terminates.

In some illustrative examples, method 1000 connects a viscous material source to a port of a viscous material deposition nozzle (operation 1006). In some illustrative examples, method 1000 applies pressure to the viscous material source to force the viscous material into a distribution cavity of the viscous material deposition nozzle (operation 1008).

In some illustrative examples, method 1000 moves the viscous material deposition nozzle across the surface of the substrate with planar portions of the pair of lifts in contact with the surface of the substrate (operation 1010). In some illustrative examples, method 1000 moves the viscous material deposition nozzle across the surface of the substrate with rounded portions of the pair of lifts in contact with the surface of the substrate (operation 1012).

In some illustrative examples, scraping the viscous material comprises pushing an edge of the trailing face into the viscous material to cut the viscous material (operation 1014). In some illustrative examples, scraping the viscous material comprises pulling a rounded portion of the trailing face against the viscous material to smooth the viscous material to the finished thickness (operation 1016).

Figure 11:
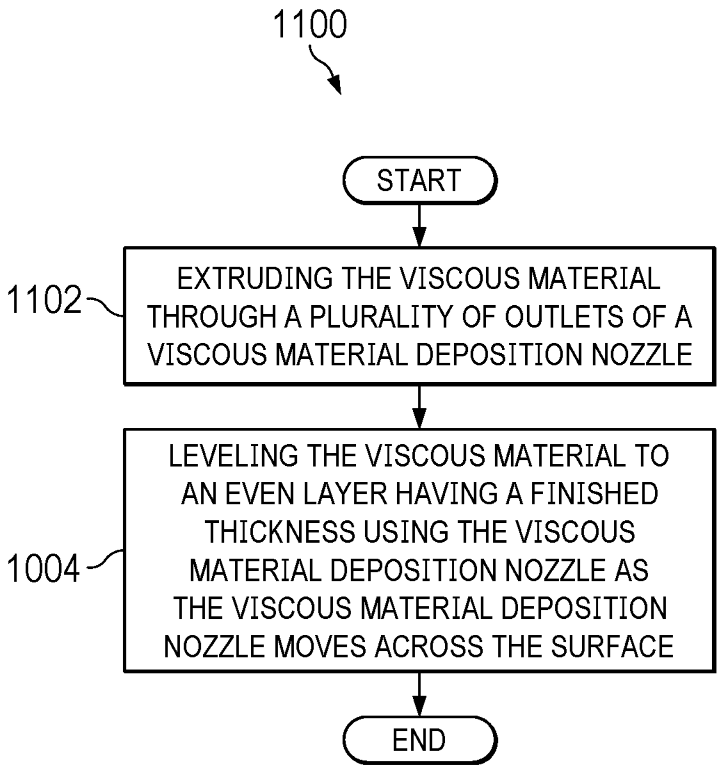
FIG. 11 is a flowchart of method of applying a viscous material to a surface of a substrate in accordance with an illustrative embodiment.

Turning now to FIG. 11, a flowchart of method of applying a viscous material to a surface of a substrate is depicted in accordance with an illustrative embodiment. Method 1100 can be performed to form a component of aircraft 100 of FIG. 1. Method 1100 can be performed using viscous material deposition nozzle 200 of FIG. 2. Method 1100 can be performed using viscous material deposition nozzle 300 of FIGS. 3-8. Method 1100 can be performed using viscous material deposition nozzle 900 of FIG. 9.

Method 1100 extrudes the viscous material through a plurality of outlets of a viscous material deposition nozzle (operation 1102). Method 1100 levels the viscous material to an even layer having a finished thickness using the viscous material deposition nozzle as the viscous material deposition nozzle moves across the surface (operation 1104). Afterwards, method 1100 terminates. In some illustrative examples, leveling the viscous material to an even layer comprises pulling a trailing face of the application surface of the viscous material deposition nozzle against the viscous material.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination items and number of items may be used from the list but not all of the items in the list are required.

As used herein, "a number of," when used with reference to items means one or more items.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 1006 through operation 1016 may be optional.

Figure 12:
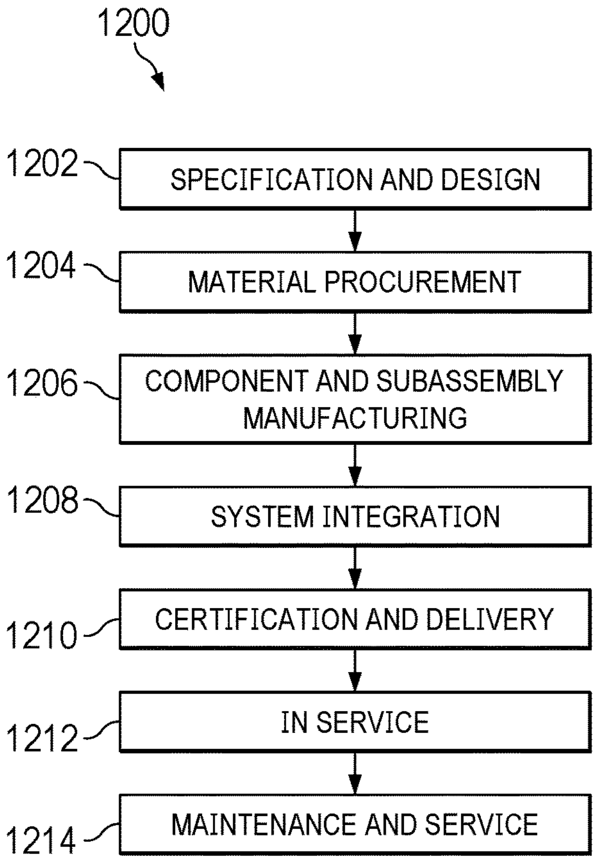
FIG. 12 is an illustration of an aircraft manufacturing and service method in a form of a block diagram in accordance with an illustrative embodiment.
Figure 13:
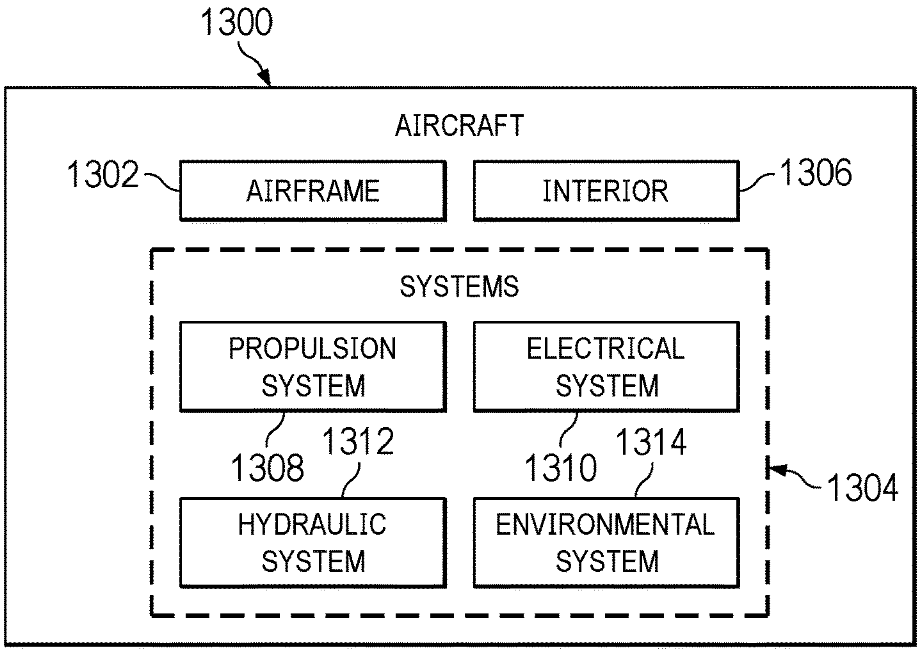
FIG. 13 is an illustration of an aircraft in a form of a block diagram in which an illustrative embodiment may be implemented.

Illustrative embodiments of the present disclosure may be described in the context of aircraft manufacturing and service method 1200 as shown in FIG. 12 and aircraft 1300 as shown in FIG. 13. Turning first to FIG. 12, an illustration of an aircraft manufacturing and service method in a form of a block diagram is depicted in accordance with an illustrative embodiment. During pre-production, aircraft manufacturing and service method 1200 may include specification and design 1202 of aircraft 1300 in FIG. 13 and material procurement 1204.

During production, component and subassembly manufacturing 1206 and system integration 1208 of aircraft 1300 takes place. Thereafter, aircraft 1300 may go through certification and delivery 1210 in order to be placed in service 1212. While in service 1212 by a customer, aircraft 1300 is scheduled for routine maintenance and service 1214, which may include modification, reconfiguration, refurbishment, or other maintenance and service.

Each of the processes of aircraft manufacturing and service method 1200 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 13, an illustration of an aircraft in a form of a block diagram is depicted in which an illustrative embodiment may be implemented. In this example, aircraft 1300 is produced by aircraft manufacturing and service method 1200 of FIG. 12 and may include airframe 1302 with plurality of systems 1304 and interior 1306. Examples of systems 1304 include one or more of propulsion system 1308, electrical system 1310, hydraulic system 1312, and environmental system 1314. Any number of other systems may be included.

Apparatuses and methods embodied herein may be employed during at least one of the stages of aircraft manufacturing and service method 1200. One or more illustrative embodiments may be manufactured or used during at least one of component and subassembly manufacturing 1206, system integration 1208, in service 1212, or maintenance and service 1214 of FIG. 12.

A portion of airframe 1302 or interior 1306 of aircraft 1300 can be formed by method 1000. Method 1000 can be performed during component and subassembly manufacturing 1206. A structure with a sealant, adhesive, or other viscous material deposited using method 1000 can be present and utilized during in service 1212. Method 1000 can be performed during maintenance and service 1214 to form a replacement part.

The illustrative examples provide a viscous material deposition nozzle that allows extrusion of wider material films than possible with currently available nozzles. The illustrative examples can extrude an approximately 3 inch wide film, with the possibility of wider films.

The illustrative examples allow extrusion of a thin material film of constant thickness. Currently available nozzles do not provide any sort of thickness control. Providing thickness control in the viscous material deposition nozzle reduces at least one of manufacturing time, manufacturing cost, and utilized materials.

The illustrative examples allow even extrusion of viscous materials despite significant tool width. The shape of the distribution cavity as well as lengths of plurality of outlets provide even extrusion.

The illustrative examples can be used as a single-use nozzle tool for attachment to viscous material cartridges. With applied pressure, viscous material flows from the cartridge into the nozzle cavity, and is extruded out of a row of slots. A set of steps on the underside of the nozzle yield a material film of constant thickness. The geometry of the nozzle cavity yields even extrusion along the length of the nozzle. The geometry of the nozzle cavity also allows self-supporting additive manufacturing with a fused deposition modeling process.

The internal distribution cavity allows a greater number of manufacturing options (most significantly, supportless FDM). Additionally, the internal cavity allows even extrusion of viscous material along a wide extrusion length. The bottom surface of the tool has a novel step feature that allows precise thickness control of the extruded material film. The viscous material deposition nozzle reduces material waste, and reduces process steps for material lay-down relative to currently available nozzles.

The viscous material deposition nozzle forms a wide film of material at a constant thickness. The viscous material deposition nozzle has a housing enclosing a manifold, with a lift (ski) on each end, the manifold extruding at a plurality of locations at a front face (leading face) with a following shaving face (trailing face). The shaving face has a height difference with the lifts (skis) equal to the extrusion thickness. The distance between the lifts is equal to the width of the extrusion.

A method of forming a precise width and precise thickness bead in one operation comprises a manifold dividing viscous material, such as a sealant, adhesive, or other viscous material over a width between two lifts. The viscous material is dispensed into a chamber between the leading face, lift and the surface to be applied onto. The thickness of the viscous material is shaped using a trailing face. A large radius internal cavity allows filament build up additive manufacturing of the viscous material deposition nozzle.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A viscous material deposition nozzle that comprises:
- a first lift positioned on a first side and a second lift positioned on a second side of the viscous material deposition nozzle, wherein each lift comprises, respectively, a contact surface separated from each other by more than 1.75 inches;
- an application surface positioned between and connected to the lifts and comprising a leading face a first distance from the contact surfaces and a trailing face a second distance from the contact surfaces, the second distance less than the first distance; and
- a channel that opens into one distribution cavity that comprises a V-shape and a plurality of outlets that extend through the application surface between the first lift and the second lift, wherein a respective length of each outlet decreases as a distance of each outlet from the channel increases, wherein the plurality of outlets is positioned at an intersection of the leading face and the trailing face.

2. The viscous material deposition nozzle of claim 1, wherein the trailing face comprises a rounded portion on a trailing end of the viscous material deposition nozzle.

3. The viscous material deposition nozzle of claim 1, wherein the one distribution cavity is configured to distribute viscous material to the plurality of outlets.

4. The viscous material deposition nozzle of claim 1, wherein the channel is within a port that comprises a threaded exterior.

5. The viscous material deposition nozzle of claim 3, wherein the distribution cavity comprises a first arm extending at a downward angle toward the first side of the viscous material deposition nozzle and a second arm extending at a downward angle toward the second side of the viscous material deposition nozzle.

6. The viscous material deposition nozzle of claim 3, wherein a ceiling of the distribution cavity is rounded.

7. The viscous material deposition nozzle of claim 1, wherein the plurality of outlets is ten.

8. The viscous material deposition nozzle of claim 1 further comprising:

- a port with exterior threads configured to connect to a viscous material source.

9. The viscous material deposition nozzle of claim 1, wherein a distance between the first lift and the second lift controls a width of viscous material deposited.

10. The viscous material deposition nozzle of claim 1, wherein a distance that the contact surface of the first lift and the contact surface of the second lift extend from the distribution cavity controls a thickness of viscous material deposited.

11. A viscous material deposition nozzle that comprises:
- a channel that opens into one distribution cavity that comprises a V-shape and a plurality of outlets that open through a stepped application surface connected, outboard of the plurality of outlets, to a first lift and a second lift, wherein a respective length of each outlet decreases as a distance of each outlet from the channel increases, wherein:
  - the stepped application surface comprises a leading face and a trailing face, the trailing face extending outwardly away from the leading face; and
  - the plurality of outlets is positioned at an intersection of the leading face and the trailing face;
- a first lift and a second lift separated by more than 1.75 inches and each comprising a respective contact surface; and
- the stepped application surface configured to evenly spread a viscous material and then scrape the viscous material to a finished thickness defined by a distance from a contact surface of the first lift to a trailing face of the stepped application surface.

12. The viscous material deposition nozzle of claim 11, wherein a distance from the leading face to the contact surface of the first lift is greater than a distance from the trailing face to the contact surface of the first lift.

13. The viscous material deposition nozzle of claim 11, wherein the plurality of outlets is ten.

14. The viscous material deposition nozzle of claim 11, wherein the stepped application surface extends between the first lift and the second lift and is configured to set a width of viscous material applied.

15. The viscous material deposition nozzle of claim 11, wherein the first lift and the second lift are configured, along with the trailing face of the stepped application surface, to control the finished thickness.

16. A method of applying a viscous material to a surface of a substrate, the method comprising:
- extruding the viscous material through a channel connected to one distribution cavity comprising a V-shape and a plurality of outlets extending through an application surface of a viscous material deposition nozzle, the application surface bordered on one side by a first lift and on a second side by a second lift each located outboard of the plurality of outlets and separated by more than 1.75 inches, wherein:
  - a respective length of each outlet decreases as a distance of each outlet from the channel increases;
  - the application surface comprises a leading face a first distance from a contact surface of the first lift and a trailing face a second distance from the contact surface of the first lift, the second distance less than the first distance; and
  - the plurality of outlets is positioned at an intersection of the leading face and the trailing face; and
- moving the viscous material deposition nozzle moves across the surface with contact surfaces of each lift contacting the surface and scraping the viscous material to a finished thickness using a trailing face of the application surface of the viscous material deposition nozzle elevated above the surface of the substrate by a distance of a trailing face of the application surface from the contacting surfaces.

17. The method of claim 16, wherein scraping the viscous material comprises pushing an edge of the trailing face into the viscous material to cut the viscous material.

18. The method of claim 17 further comprising:

moving the viscous material deposition nozzle across the surface of the substrate with planar portions of the first lift and the second lift in contact with the surface of the substrate.

19. The method of claim 16, wherein scraping the viscous material comprises pulling a rounded portion of the trailing face against the viscous material to smooth the viscous material to the finished thickness.

20. The method of claim 19 further comprising:

moving the viscous material deposition nozzle across the surface of the substrate with rounded portions of the first lift and the second lift in contact with the surface of the substrate.

21. The method of claim 16, further comprising:

connecting a viscous material source to a port of a viscous material deposition nozzle; and applying pressure to the viscous material source to force the viscous material into a distribution cavity of the viscous material deposition nozzle.

22. A method of applying a viscous material to a surface of a substrate, the method comprising:

extruding the viscous material through a channel opening to one distribution cavity comprising a V-shape and a plurality of outlets of a viscous material deposition nozzle, the outlets opening to an application surface bordered on one side by a first lift and on a second side by a second lift, each lift located outboard of the plurality of outlets and separated by more than 1.75 inches, wherein:

a respective length of each outlet decreases as a distance of each outlet from the channel increases;

the application surface comprises a leading face a first distance from a contact surface of the first lift and a trailing face a second distance from the contact surface of the first lift, the second distance less than the first distance; and the plurality of outlets is positioned at an intersection of the leading face and the trailing face; and leveling the viscous material to an even layer having a finished thickness using a step in the application surface of the viscous material deposition nozzle as the viscous material deposition nozzle moves across the surface.

23. The method of claim 22, wherein leveling the viscous material to an even layer comprises pulling a trailing face of the application surface of the viscous material deposition nozzle against the viscous material.

* * * * *